United States Patent [19]

Murugan

[11] Patent Number: 5,140,509

[45] Date of Patent: Aug. 18, 1992

[54] REGULATED BI-DIRECTIONAL DC-TO-DC VOLTAGE CONVERTER

[75] Inventor: Muthu K. Murugan, Howell, N.J.

[73] Assignee: Allied-Signal Inc., Morris Township, Morris County, N.J.

[21] Appl. No.: 790,737

[22] Filed: Nov. 8, 1991

[51] Int. Cl.$^5$ .......................................... H02M 3/337
[52] U.S. Cl. ...................................... 363/17; 363/24; 363/127; 323/299; 318/376
[58] Field of Search ...................... 363/16, 17, 24, 25, 363/26, 98, 124, 125, 127, 131, 132, 133; 323/222, 299; 318/376, 379; 330/10

[56] References Cited

U.S. PATENT DOCUMENTS

| | | |
|---|---|---|
| 3,579,078 | 5/1971 | Cronin et al. |
| 4,716,514 | 12/1987 | Patel ................................. 363/127 |
| 4,922,404 | 5/1990 | Ludwig et al. ................. 363/127 X |
| 5,057,990 | 10/1991 | Gulczynski .......................... 363/131 |

Primary Examiner—Emanuel T. Voeltz
Attorney, Agent, or Firm—Howard G. Massung; Robert A. Walsh

[57] ABSTRACT

A pulse-width modulated, bi-directional DC-to-DC voltage converter having a regulated output, and capable of converting between a high-potential direct current voltage and a low-potential direct current voltage. The converter's magnetic components, as well as several of its semiconductor rectifiers, perform dual functions (one in the step-up mode, and another in the step-down mode), which serves to minimize the total component count, and allows the converter to be both compact and lightweight.

6 Claims, 7 Drawing Sheets

REGULATED BI-DIRECTIONAL DC-TO-DC VOLTAGE CONVERTER

BACKGROUND OF THE INVENTION

The present invention provides a regulated bi-directional DC-to-DC voltage converter. More particularly, a bi-directional DC-to-DC voltage converter having a regulated output, and capable of converting between a high-potential direct current voltage and a low-potential direct current voltage via a pulse-width modulation ("PWM") technique. Additionally, the disclosed invention accomplishes the voltage conversions with a minimal number of components, and therefore provides for a reliable converter which offers advantages in size and weight over prior art designs.

Regulated bi-directional DC-to-DC voltage converters are employed extensively in aerospace applications to provide a means of coupling batteries (typically a 28 volt arrangement of cells) and the high-voltage (typically 270 V) DC bus which provides power to the various flight systems. When in a "step-up" mode the converters function to increase the battery voltage level to the required high-voltage bus level, and when in an "step-down" mode, the converters reduce the high voltage available on the bus to a level suitable for battery charging.

As with most components intended for aerospace applications, the minimization of the size and weight of bi-directional voltage converters is of great concern. The primary contributors to both the size and weight of such a voltage converter are its transformer and inductors (the so-called "magnetic components"). As typical regulated bi-directional DC-to-DC voltage converters require at least two inductors (one on each side of the transformer) to be employed to decouple the rectifying and switching components of the converter from its DC capacitors, the impact of the magnetic components on the converter's size and weight is increased even further.

Accordingly, it is the object of the present invention to provide a regulated bi-directional DC-to-DC voltage converter which employs a single transformer and one mutually coupled inductor (thus reducing the size and weight of the converter), and which provides a stable output voltage level over a wide range of input voltage variation in either the step-up or step-down mode.

SUMMARY OF THE INVENTION

This invention provides a bi-directional DC-to-DC voltage converter having a regulated output, and capable of converting between a high-potential direct current voltage and a low-potential direct current voltage using a PWM technique. Within the disclosed converter, the magnetic components, as well as several of the semiconductor rectifiers, perform dual functions (one in the step-up mode, and another in the step-down mode). This dual functionality serves to minimize the total component count, allowing the converter to be both compact and light weight; two critical attributes for aerospace applications.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which:

FIG. 1B is a schematic diagram illustrating a circuit equivalent to the preferred embodiment of FIG. 1A in the "down$_{on}$" state when the first negative and second positive bridge transistors are biased on;

FIG. 1C is a schematic diagram illustrating a circuit equivalent to the preferred embodiment of FIG. 1A in the "down$_{on}$" state when the second negative and first positive bridge transistors are biased on;

FIG. 1E is a schematic diagram illustrating a circuit equivalent to the preferred embodiment of FIG. 1A in the "up$_{on}$" state when the positive boost transistor is biased on;

FIG. 1F is a schematic diagram illustrating a circuit equivalent to the preferred embodiment of FIG. 1A in the "up$_{on}$" state when the negative boost transistor is biased on;

DETAILED DESCRIPTION OF THE INVENTION

As is shown in FIG. 1, a preferred embodiment the invention consists of two sub-circuits: a boost converter 1 and a bridge converter 2. These sub-circuits share a common negative line and are also interconnected by a transformer 3, and a mutually coupled inductor 4. The transformer's primary winding has a first terminal, a first tap terminal, a second tap terminal, and a second terminal. The secondary winding of the transformer has a first terminal, a second terminal, and a center-tap terminal. The turn ratio between the primary and secondary windings of the transformer is N:1. The coupled inductor's primary and secondary windings each have a first and a second terminal. The turn ratio between the primary and secondary windings of the inductor is N:1.

Figure 1A:
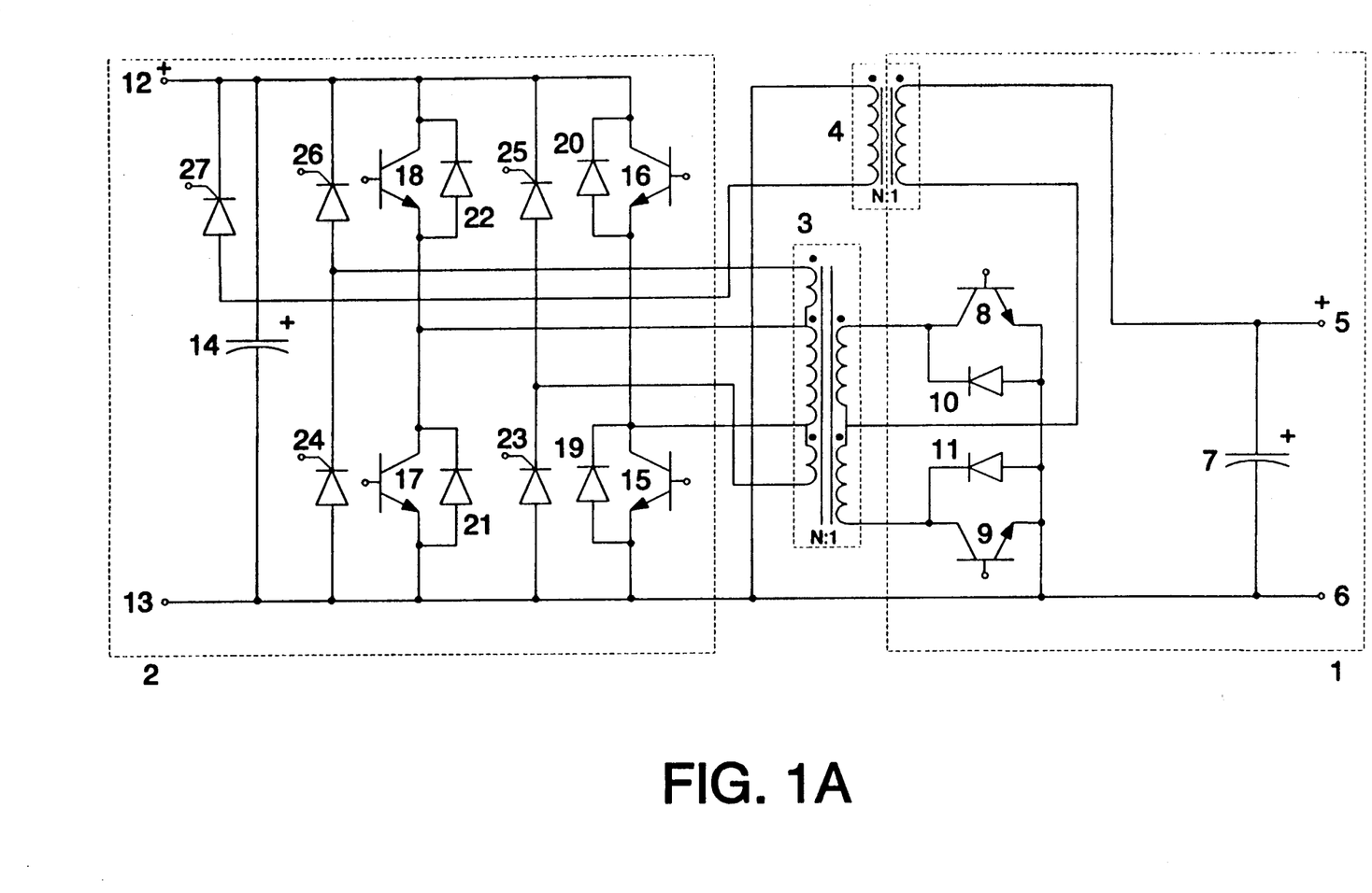
FIG. 1A is a schematic diagram of a preferred embodiment of the invention.

The boost converter sub-circuit has a positive input/output terminal 5 and a negative input/output terminal 6, with a filter capacitor 7 connected between them. In operation, the input/output lines of this sub-circuit are connected to the low-voltage supply. The positive input/output terminal is also connected to the first terminal of the coupled inductor's primary winding. The second terminal of coupled inductor's primary winding is coupled to the center-tap terminal of the transformer's secondary winding. The negative input/output terminal of the boost sub-circuit is coupled the negative input/output terminal of the bridge converter sub-circuit, and to the emitters of two NPN transistors 8, 9. One of the transistors 8, designated the positive boost transistor, has its collector lead coupled to the first terminal of the transformer's secondary winding. The emitter and collector of this transistor are bridged by a diode 10, connected so that the anode of the diode is coupled to the transistor's emitter, and the cathode of the diode is coupled to the transistor's collector. The other transistor 9, designated the negative boost transistor, has its collector lead coupled to the second terminal of the transformer's secondary winding. The emitter and collector of this transistor are bridged by a second diode 11, connected so that the anode of the diode is coupled to the transistor's emitter, and the cathode of the diode is coupled to the transistor's collector.

As with the boost converter sub-circuit, the bridge converter sub-circuit also has a positive input/output terminal 12 and a negative input/output terminal 13 which are bridged by a filter capacitor 14. In operation, the input/output lines of this sub-circuit are connected to the high-voltage bus. The bridge converter sub-circuit also contains a network of four NPN transistors 15, 16, 17, 18, four diodes 19, 20, 21, and five silicon controlled rectifiers ("SCRs") 23, 24, 25, 26, 27.

The collector of one of the transistors 15, designated the first negative bridge transistor, is coupled to the second tap terminal of the transformer's primary winding, and its emitter is coupled to the negative input/output terminal of the bridge converter sub-circuit. The emitter and collector of this transistor are bridged by a diode 19, connected so that the anode of the diode is coupled to the transistor's emitter, and the cathode of the diode is coupled to the transistor's collector.

The emitter of the second transistor 16, designated the first positive bridge transistor, is coupled to the second tap terminal of the transformer's primary winding, while its collector is coupled to the positive input/output lead of the bridge converter sub-circuit. The emitter and collector of this second transistor are also bridged by a diode 20, connected so that the anode of the diode is coupled to the transistor's emitter, and the cathode of the diode is coupled to the transistor's collector.

The collector of the third transistor 17, designated the second negative bridge transistor, is coupled to the first tap terminal of the transformer's primary winding, and its emitter is coupled to the negative input/output terminal of the bridge converter sub-circuit. The emitter and collector of this transistor are bridged by a diode 21, connected so that the anode of the diode is coupled to the transistor's emitter, and the cathode of the diode is coupled to the transistor's collector.

The emitter of the fourth transistor 18, designated the second positive bridge transistor, is coupled to the first tap terminal of the transformer's primary winding, while its collector is coupled to the positive input/output lead of the bridge converter sub-circuit. The emitter and collector of this second transistor are also bridged by a diode 22, connected so that the anode of the diode is coupled to the transistor's emitter, and the cathode of the diode is coupled to the transistor's collector.

The anode of the first SCR 25, designated the first positive SCR, is coupled to the second terminal of the transformer's primary winding, while it's cathode is coupled to the positive input/output lead of the bridge converter sub-circuit. The cathode of a second SCR 23, designated the first negative SCR, is also coupled to the second terminal of the transformer's primary winding. The anode of this first negative SCR is coupled to the negative input/output lead of the bridge converter sub-circuit.

The anode of the third SCR 26, designated the second positive SCR, is coupled to the first terminal of the transformer's primary winding, while it's cathode is coupled to the positive input/output lead of the bridge converter sub-circuit. The cathode of a fourth SCR 24, designated the second negative SCR, is also coupled to the first terminal of the transformer's primary winding. The anode of this second negative SCR is coupled to the negative input/output lead of the bridge converter sub-circuit.

The anode of the fifth SCR 27, designated the inductor SCR, is coupled to the second terminal of the coupled inductor's secondary winding, while its cathode is coupled to the positive input/output lead of the bridge converter sub-circuit. The first terminal of the coupled inductor's secondary winding is coupled to negative input/output lead of the bridge converter sub-circuit.

Figure 1B:
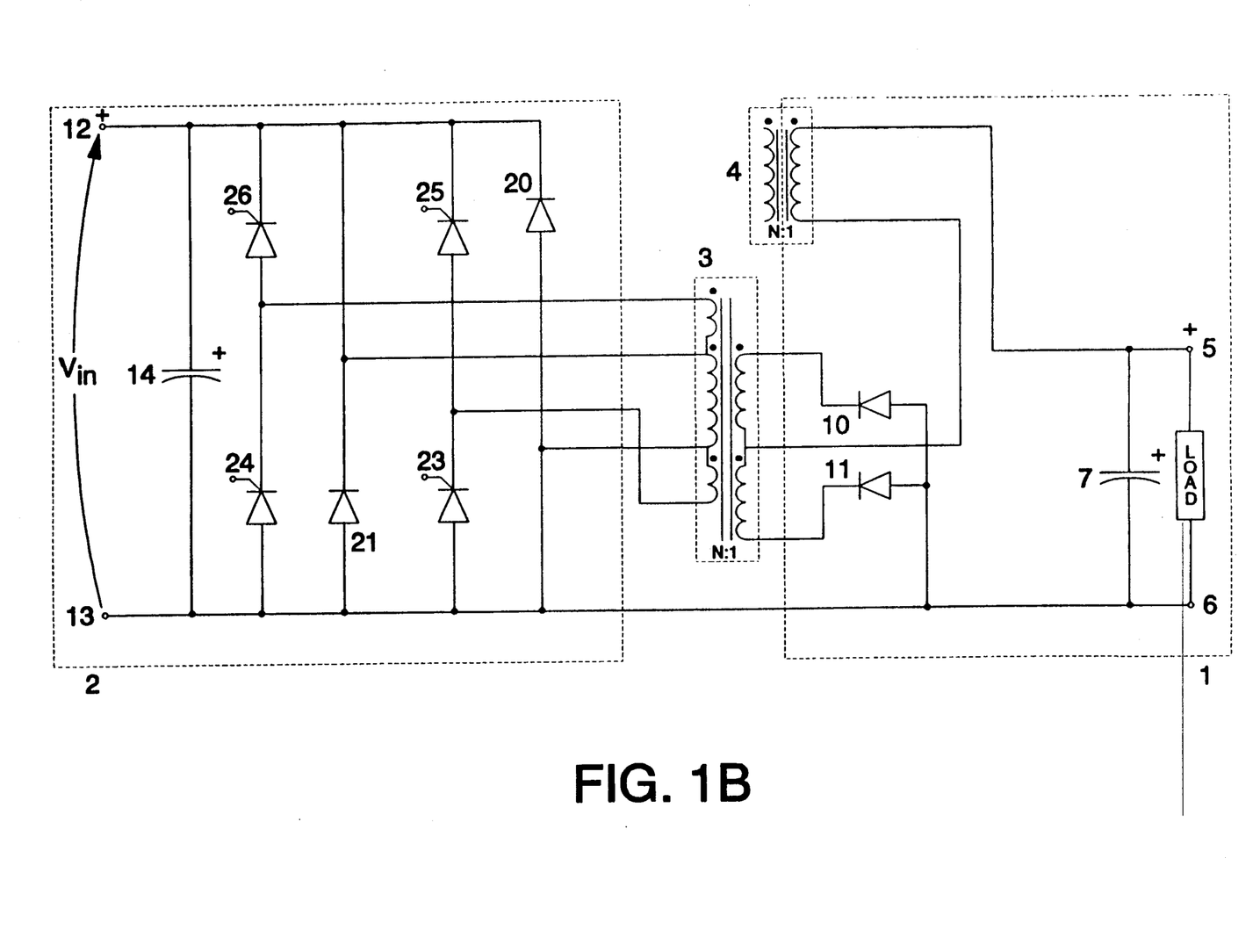
Figure 1C:
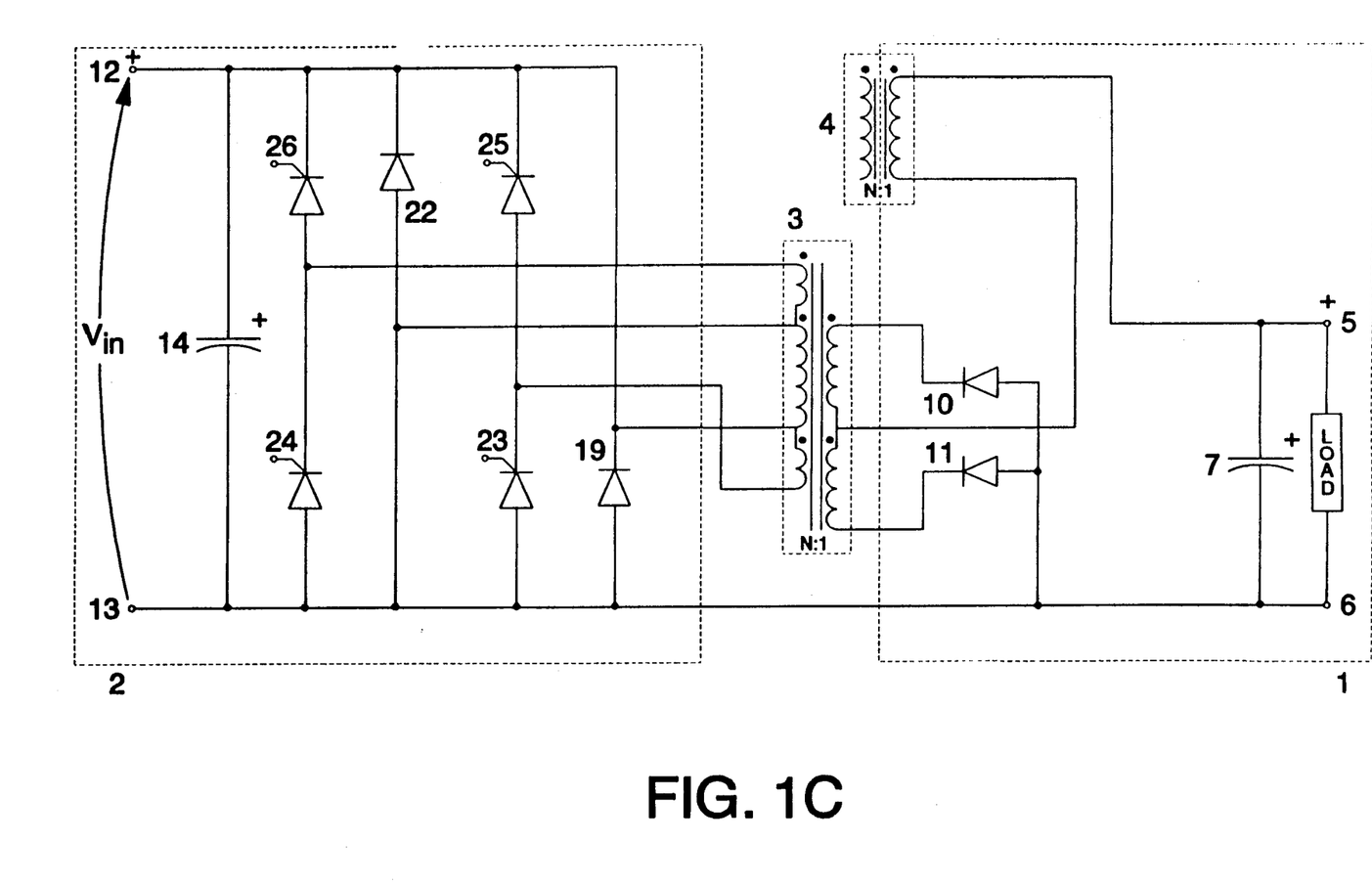
Figure 1D:
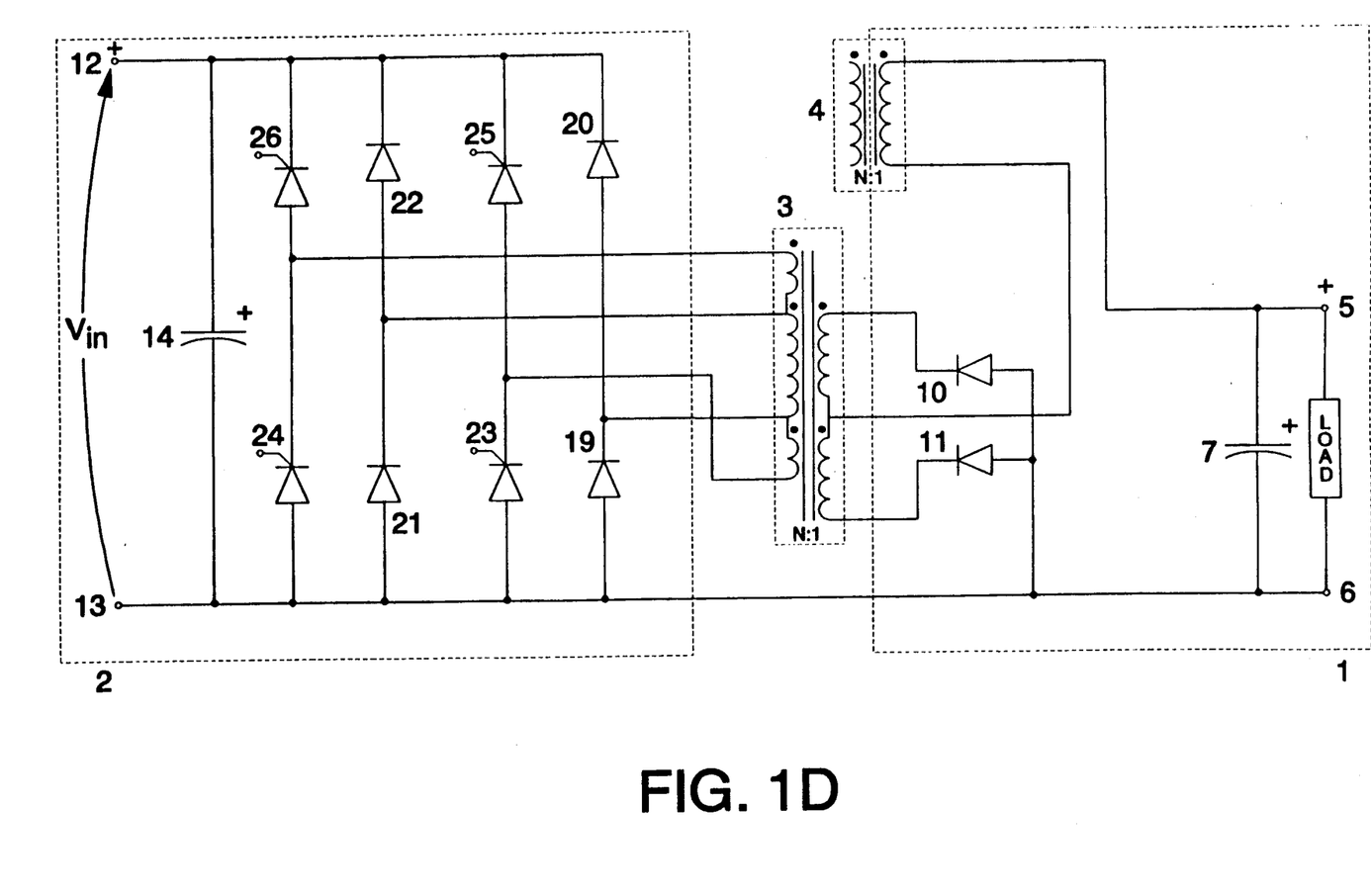
FIG. 1D is a schematic diagram illustrating a circuit equivalent to the preferred embodiment of FIG. 1A in the "down$_{off}$" state.

As stated earlier, the invention performs both step-up and step-down conversions. Operation of the above described embodiment in both of those modes is discussed below:

For step-down conversion the converter is repeatedly switched between two states, "down$_{on}$" and "down$_{off}$", and the duty cycle is varied so as to achieve the proper output voltage regulation. In the down$_{on}$ state the five SCRs in the bridge converter sub circuit are biased off, while the four transistors within the bridge converter are switched between conductive ("on") and non-conductive ("off") states as pairs. In the down$_{on}$ state the four transistors within the bridge converter sub-circuit are switched between conductive ("on") and non-conductive ("off") states as pairs. One pair, consisting of the first negative bridge transistor and the second positive bridge transistor are first biased on, while the other pair, consisting of the second negative bridge transistor and the first positive bridge transistor are biased off (see the equivalent circuit illustrated in FIG. 1B). The biasing is then changed to reverse the conductive states of the transistor pairs (see the equivalent circuit illustrated in FIG. 1C). This bias switching, the frequency of which is determined as a function of the converter's application, effectively delivers high-voltage DC pulses of alternating polarities to the primary winding of the transformer. While the conductive states of these transistor pairs are being alternately switched, the two transistors contained in the boost sub circuit are biased to off throughout step-down operation, allowing their companion diodes to act as a single phase push-pull rectifier, and deliver a series of low-voltage pulses having the same polarity to the inductor, the boost sub-circuit filter capacitor, and any load coupled to the boost sub-circuit input/output terminals. In the down$_{off}$ state, the four transistors and five SCRs within the bridge converter sub-circuit, as well as the two transistors in the boost sub circuit are biased off (see the equivalent circuit illustrated in FIG. 1D). This allows energy stored in the inductor to freewheel through the secondary winding of the transformer, the boost sub-circuit diodes, and any load connected to the boost sub-circuit input/output terminals.

Figure 1E:
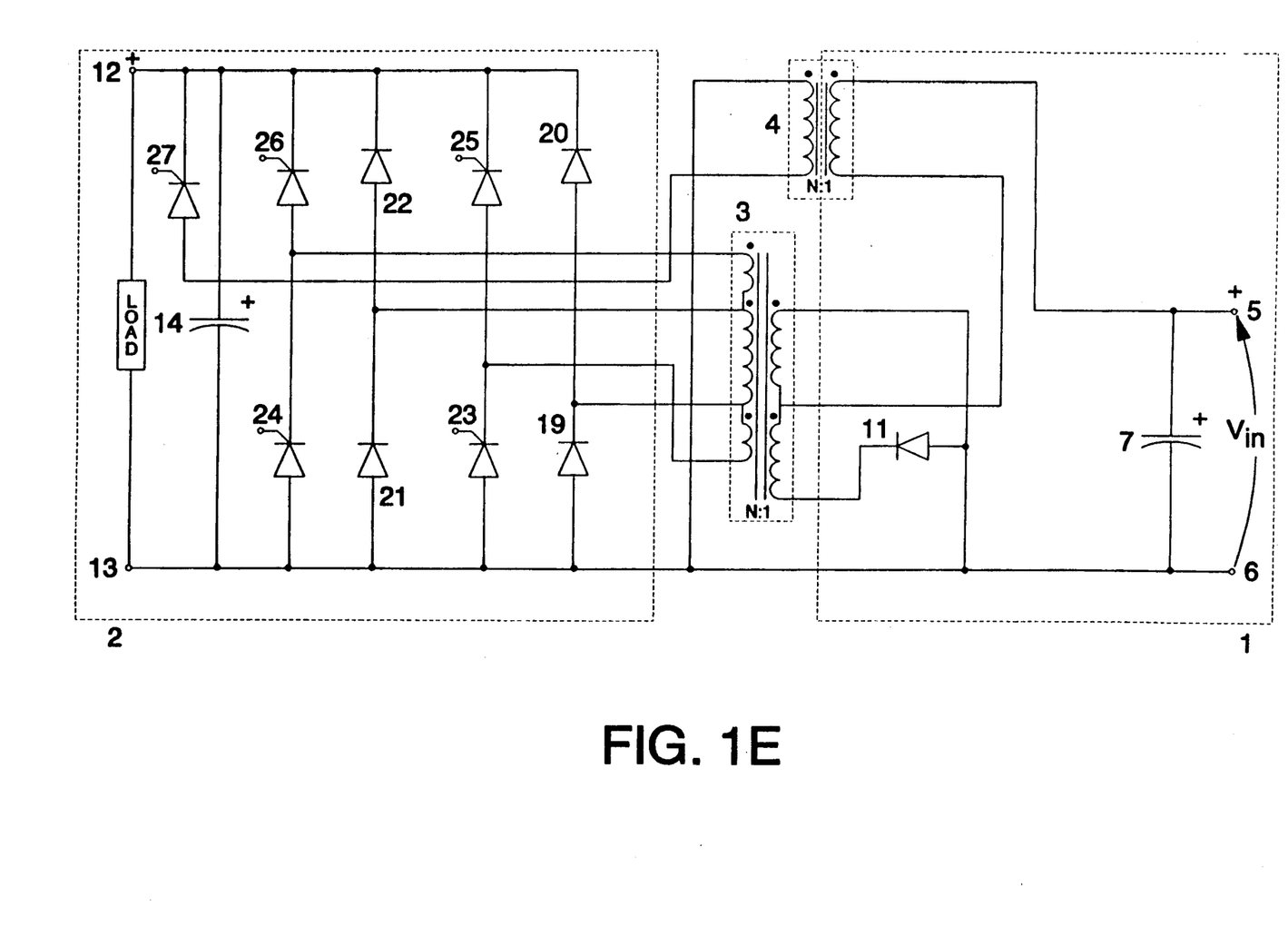
Figure 1F:
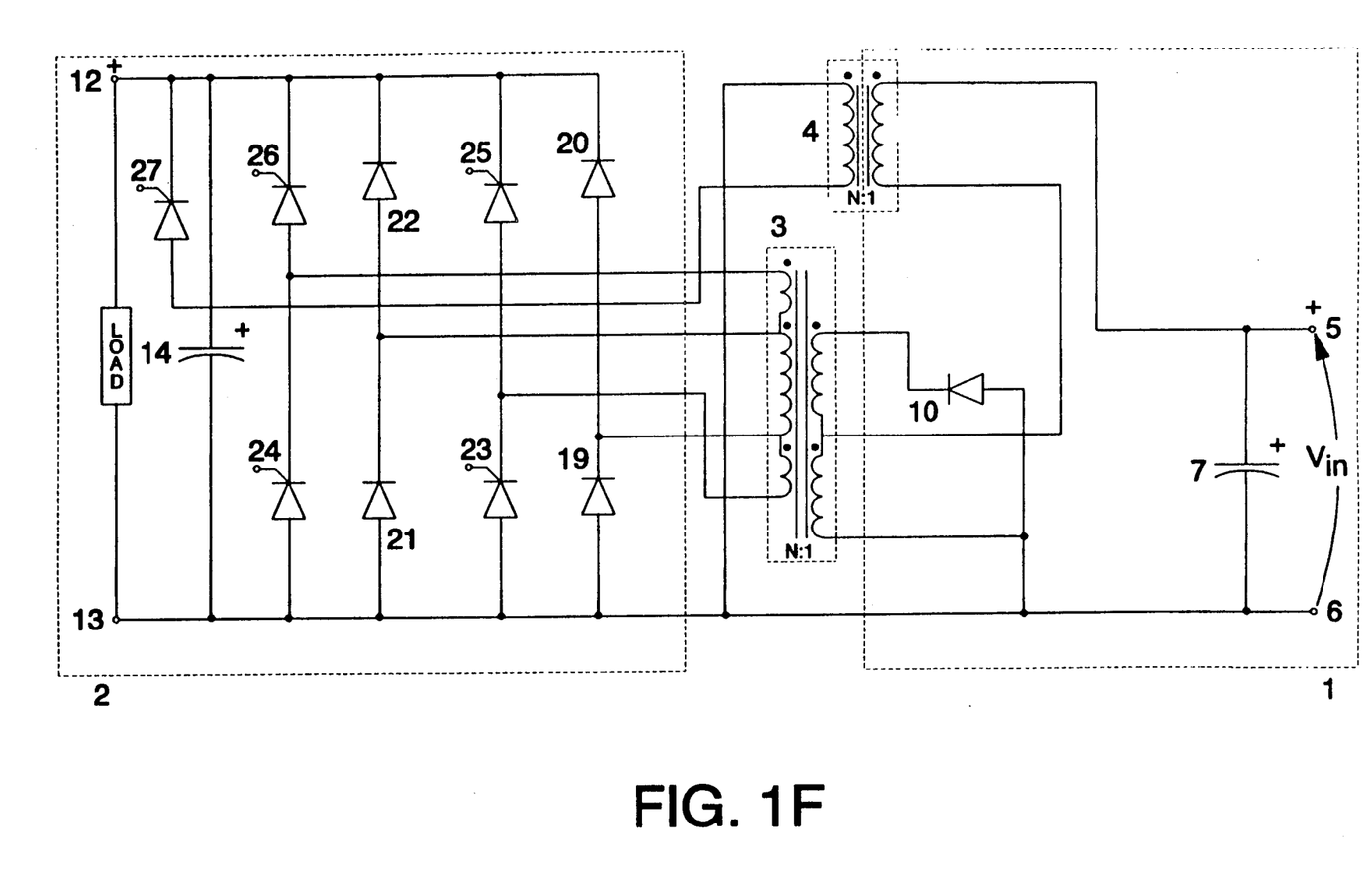
Figure 1G:
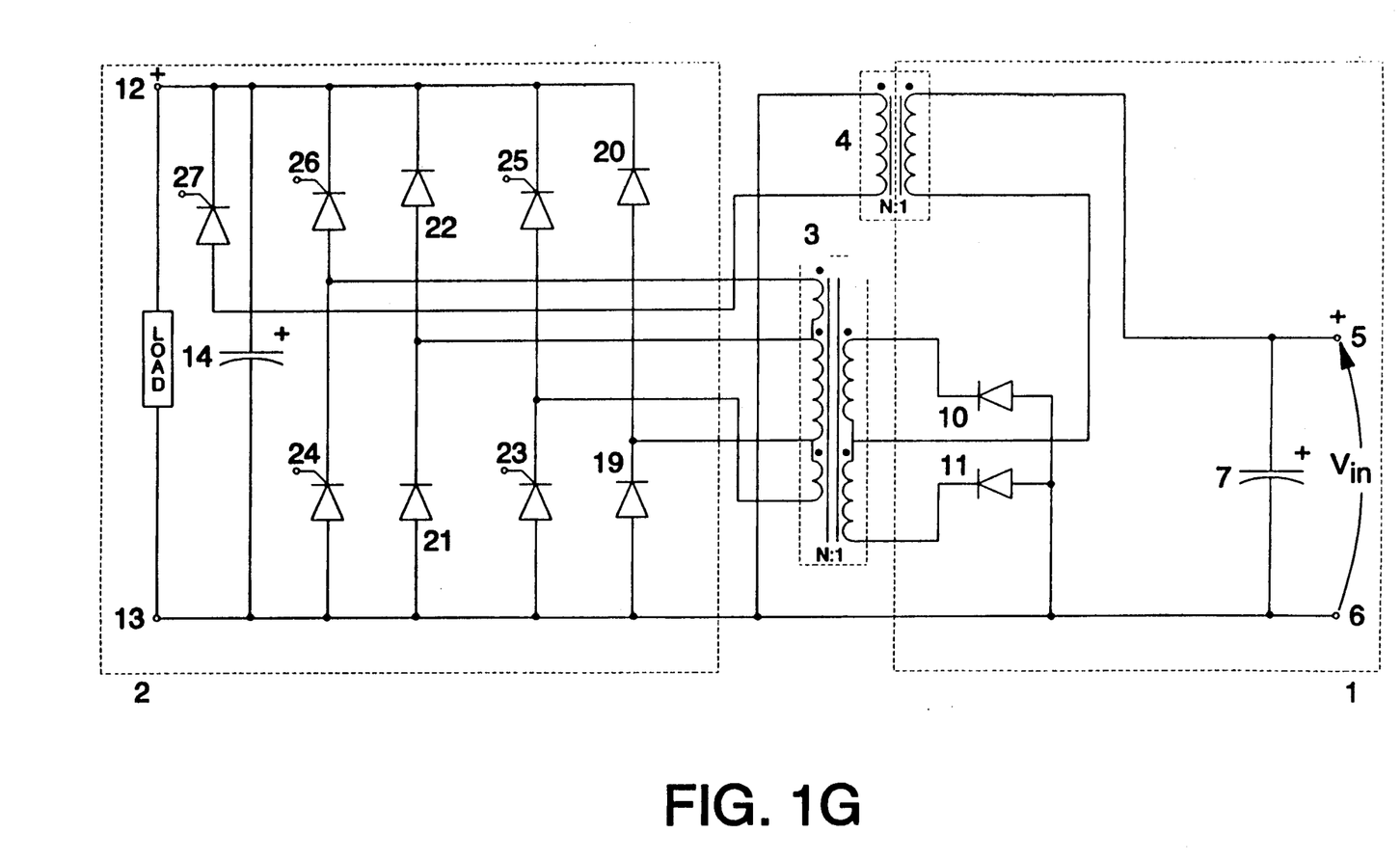
FIG. 1G is a schematic diagram illustrating a circuit equivalent to the preferred embodiment of FIG. 1A in the "up$_{off}$" state.

For step-up conversion the converter is also repeatedly switched between two states, "up$_{on}$" and "up$_{off}$", and the duty cycle is varied so as to achieve the proper output voltage regulation. In the up$_{on}$ state the five SCRs in the bridge converter sub-circuit are biased on, and the four transistors within the bridge converter sub-circuit are biased off. The two transistors contained in the boost sub-circuit are then alternately biased on and off—One being "off" while the other is "on" (see the equivalent circuits illustrated in FIGS. 1E and 1F). The frequency at which the biasing is switched being a function of the specific application in which the converter is employed. This switching permits the induced voltage across the inductor (due to the energy stored in the up$_{off}$ state), as well as the voltage applied to the boost sub-circuit input/output terminals (which is delivered as low-voltage DC pulses of alternating polarities to the secondary winding of the transformer) to be stepped-up through the transformer and delivered to a load connected across the input/output terminals of the bridge converter sub-circuit. In the up$_{off}$ state the four transistors within the bridge converter sub-circuit, the two transistors contained in the boost sub-circuit, and the positive and negative SCRs are biased off, and the inductor SCR is biased on (see the equivalent circuit illustrated in FIG. 1G). This effectively prohibits any DC power entering on the boost sub-circuit input/output terminals from being transferred through the transformer to the bridge sub-circuit, while allowing the energy previously stored in the inductor and the bridge converter filter capacitor to supply the high-voltage load (connected to the input/output terminals of the bridge sub-circuit) with power.

The transistors referred to in the above preferred embodiment description may be standard bipolar type, insulated gate bipolar transistors, or field effect transistors. In addition, transistors are by no means the only type of switching device which could be employed in the invention. For example, thyristors may be substituted for all or some of the aforementioned transistors.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A bi-directional DC-to-DC voltage converter, which comprises:
   a boost sub-circuit having a positive input/output terminal and a negative input/output terminal;
   a bridge sub-circuit having a positive input/output terminal and a negative input/output terminal, said negative input/output terminal being coupled to the negative input/output terminal of the boost sub-circuit;
   a transformer having a primary and a secondary winding, said primary winding having a first terminal, a first tap terminal, a second tap terminal, and a second terminal, said secondary winding having a first terminal, a second terminal, and a center-tap terminal;
   a first filter capacitor coupling the positive and negative input/output terminals of said boost sub-circuit;
   a first inductor, having a first and second terminal, said first terminal being coupled to the positive input/output terminal of said boost sub-circuit, and said second terminal being coupled to the center-tap terminal of said transformer;
   a first switching means interposed between the first terminal of said transformer's secondary winding and the negative input/output terminal of said boost sub-circuit;
   a first rectifying means interposed between the first terminal of said transformer's secondary winding and the negative input/output terminal of said boost sub-circuit, and polarized so as to allow current to flow from the negative input/output terminal of said boost sub-circuit to the first terminal of said transformer's secondary winding;
   a second switching means interposed between the second terminal of said transformer's secondary winding and the negative input/output terminal of said boost sub-circuit;
   a second rectifying means interposed between the second terminal of said transformer's secondary winding and the negative input/output terminal of said boost sub-circuit, and polarized so as to allow current to flow from the negative input/output terminal of said boost sub-circuit to the second terminal of said transformer's secondary winding;
   a third switching means interposed between the second tap terminal of said transformer's primary winding and the negative input/output terminal of said bridge sub-circuit;
   a third rectifying means interposed between the second tap terminal of said transformer's primary winding and the negative input/output terminal of said bridge sub-circuit, and polarized so as to allow current to flow from the negative input/output terminal of said bridge sub-circuit to the second tap terminal of said transformer's primary winding;
   a fourth switching means interposed between the second tap terminal of said transformer's primary winding and the positive input/output terminal of said bridge sub-circuit;
   a fourth rectifying means interposed between the second tap terminal of said transformer's primary winding and the positive input/output terminal of said bridge sub-circuit, and polarized so as to allow current to flow from the second tap terminal of said transformer's primary winding to the positive input/output terminal of said bridge sub-circuit;
   a fifth switching means interposed between the first tap terminal of said transformer's primary winding and the negative input/output terminal of said bridge sub-circuit;
   a fifth rectifying means interposed between the first tap terminal of said transformer's primary winding and the negative input/output terminal of said bridge sub-circuit, and polarized so as to allow current to flow from the negative input/output terminal of said bridge sub-circuit to the first tap terminal of said transformer's primary winding;
   a sixth switching means interposed between the first tap terminal of said transformer's primary winding and the positive input/output terminal of said bridge sub-circuit;
   a sixth rectifying means interposed between the first tap terminal of said transformer's primary winding and the positive input/output terminal of said bridge sub-circuit, and polarized so as to allow current to flow from the first tap terminal of said transformer's primary winding to the positive input/output terminal of said bridge sub-circuit;
   a seventh switching means interposed between the first terminal of said transformer's primary winding and the negative input/output terminal of said bridge sub-circuit, and oriented so as to switchably allow current to flow from the negative input/output terminal of said bridge sub-circuit to the first terminal of said transformer's primary winding;
   an eighth switching means interposed between the first terminal of said transformer's primary winding and the positive input/output terminal of said bridge sub-circuit, and oriented so as to switchably allow current to flow from the first terminal of said transformer's primary winding to the positive input/output terminal of said bridge sub-circuit;
   a ninth switching means interposed between the second terminal of said transformer's primary winding and the negative input/output terminal of said bridge sub-circuit, and oriented so as to switchably allow current to flow from the negative input/output terminal of said bridge sub-circuit to the second terminal of said transformer's primary winding;

a tenth switching means interposed between the second terminal of said transformer's primary winding and the positive input/output terminal of said bridge sub-circuit, and oriented so as to switchably allow current to flow from the second terminal of said transformer's primary winding to the positive input/output terminal of said bridge sub-circuit;

a second inductor, mutually coupled to said first inductor, and having a first and second terminal, said second terminal being coupled to said negative input/output terminal of said bridge sub-circuit;

an eleventh switching means interposed between the first terminal of said second inductor and the positive input/output terminal of said bridge sub-circuit, and oriented so as to switchably allow current to flow from the first terminal of said inductor to the positive input/output terminal of said bridge sub-circuit;

a second filter capacitor coupling the positive and negative input/output terminals of said bridge sub-circuit.

2. The bi-directional DC-to-DC voltage converter of claim 1, wherein the first, second, third fourth, fifth and sixth switching means are metal oxide semiconductor field effect transistors.

3. The bi-directional DC-to-DC voltage converter of claim 1, wherein the first, second, third fourth, fifth and sixth switching means are metal oxide semiconductor controlled thyristors.

4. A bi-directional DC-to-DC voltage converter, which comprises:

a boost sub-circuit having a positive input/output terminal and a negative input/output terminal:

a bridge sub circuit having a positive input/output terminal and a negative input/output terminal, said negative input/output terminal being coupled to the negative input/output terminal of the boost sub-circuit;

a transformer having a primary and a secondary winding, said primary winding having a first terminal, a first tap terminal, a second tap terminal, and a second terminal, said secondary winding having a first terminal, a second terminal, and a center-tap terminal;

a first filter capacitor coupling the positive and negative input/output terminals of said boost sub-circuit;

a first inductor, having a first and second terminal, said first terminal being coupled to the positive input/output terminal of said boost sub-circuit, and said second terminal being coupled to the center-tap terminal of said transformer;

a first bipolar transistor, the collector of which is coupled to the first terminal of said transformer's secondary winding, and the emitter of which is coupled to the negative input/output terminal of said boost sub-circuit;

a first rectifying means interposed between the first terminal of said transformer's secondary winding and the negative input/output terminal of said boost sub-circuit, and polarized so as to allow current to flow from the negative input/output terminal of said boost sub-circuit to the first terminal of said transformer's secondary winding:

a second bipolar transistor, the collector of which is coupled to the second terminal of said transformer's secondary winding, and the emitter of which is coupled to the negative input/output terminal of said boost sub-circuit;

a second rectifying means interposed between the second terminal of said transformer's secondary winding and the negative input/output terminal of said boost sub-circuit, and polarized so as to allow current to flow from the negative input/output terminal of said boost sub-circuit to the second terminal of said transformer's secondary winding;

a third bipolar transistor, the collector of which is coupled to the second tap terminal of said transformer's primary winding, and the emitter of which is coupled to the negative input/output terminal of said bridge sub-circuit;

a third rectifying means interposed between the second tap terminal of said transformer's primary winding and the negative input/output terminal of said bridge sub-circuit, and polarized so as to allow current to flow from the negative input/output terminal of said bridge sub-circuit to the second tap terminal of said transformer's primary winding:

a fourth bipolar transistor, the emitter of which is coupled to the second tap terminal of said transformer's primary winding, and the collector of which is coupled to the positive input/output terminal of said bridge sub-circuit;

a fourth rectifying means interposed between the second tap terminal of said transformer's primary winding and the positive input/output terminal of said bridge sub-circuit, and polarized so as to allow current to flow from the second tap terminal of said transformer's primary winding to the positive input/output terminal of said bridge sub-circuit;

a fifth bipolar transistor, the collector of which is coupled to the first tap terminal of said transformer's primary winding, and the emitter of which is coupled to the negative input/output terminal of said bridge sub-circuit;

a fifth rectifying means interposed between the first tap terminal of said transformer's primary winding and the negative input/output terminal of said bridge sub-circuit, and polarized so as to allow current to flow from the negative input/output terminal of said bridge sub-circuit to the first tap terminal of said transformer's primary winding;

a sixth bipolar transistor, the emitter od which is coupled to the first tap terminal of said transformer's primary winding, and the collector of which is coupled to the positive input/output terminal of said bridge sub-circuit;

a sixth rectifying means interposed between the first tap terminal of said transformer's primary winding and the positive input/output terminal of said bridge sub-circuit, and polarized so as to allow current to flow from the first tap terminal of said transformer's primary winding to the positive input/output terminal of said bridge sub-circuit;

a first silicon controlled rectifier interposed between the first terminal of said transformer's primary winding and the negative input/output terminal of said bridge sub-circuit, and oriented so as to switchably allow current to flow from the negative input/output terminal of said bridge sub-circuit to the first terminal of said transformer's primary winding;

a second silicon controlled rectifier interposed between the first terminal of said transformer's primary winding and the positive input/output terminal of said bridge sub-circuit, and oriented so as to allow current to flow from the first terminal of said transformer's primary winding to the positive input/output terminal of said bridge sub-circuit when biased into a conducting state;

a third silicon controlled rectifier interposed between the second terminal of said transformer's primary winding and the negative input/output terminal of said bridge sub-circuit, and oriented so as to switchably allow current to flow from the negative input/output terminal of said bridge sub-circuit to the second terminal of said transformer's primary winding;

a fourth silicon controlled rectifier interposed between the second terminal of said transformer's primary winding and the positive input/output terminal of said bridge sub-circuit, and oriented so as to allow current to flow from the second terminal of said transformer's primary winding to the positive input/output terminal of said bridge sub-circuit when biased into a conducting state;

a second inductor, mutually coupled to said first inductor, and having a first and second terminal, said second terminal being coupled to said negative input/output terminal of said bridge sub-circuit;

a fifth silicon controlled rectifier interposed between the first terminal of said second inductor and the positive input/output terminal of said bridge sub-circuit, and oriented so as to allow current to flow from the first terminal of said inductor to the positive input/output terminal of said bridge sub-circuit when biased into a conducting state;

a second filter capacitor coupling the positive and negative input/output terminals of said bridge sub-circuit.

5. The bi-directional DC-to-DC voltage converter of claim 2, wherein the first, second, third fourth, fifth and sixth bipolar transistors are NPN transistors.

6. The bi-directional DC-to-DC voltage converter of claim 5, wherein the first, second, third fourth, fifth and sixth bipolar transistors are insulated gate bipolar transistors.

* * * * *